No. 821,118. PATENTED MAY 22, 1906.
G. B. OSTERHOUT.
SINGLE TRIGGER MECHANISM FOR GUNS.
APPLICATION FILED NOV. 28, 1905.
6 SHEETS—SHEET 2.
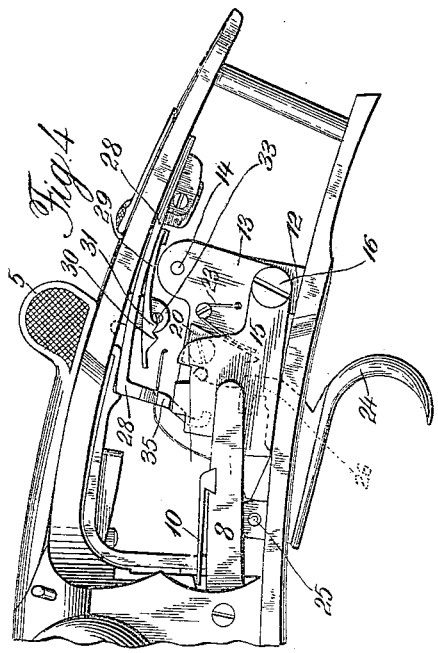
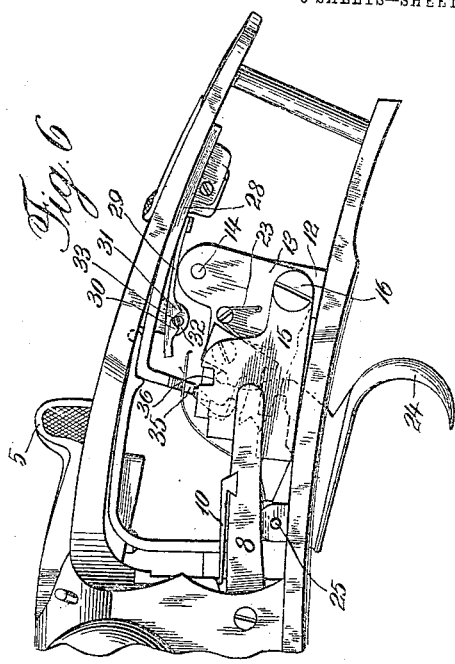
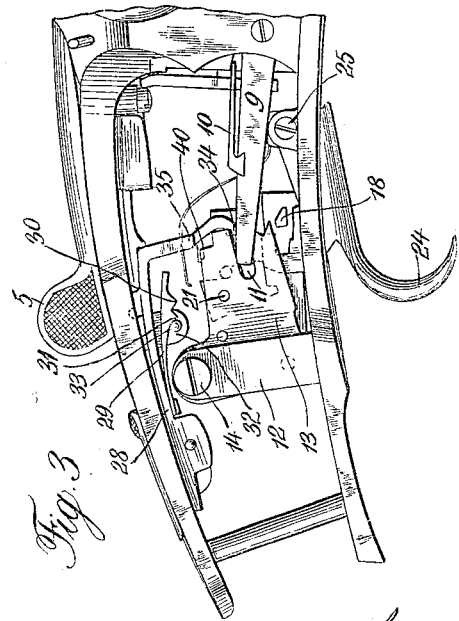
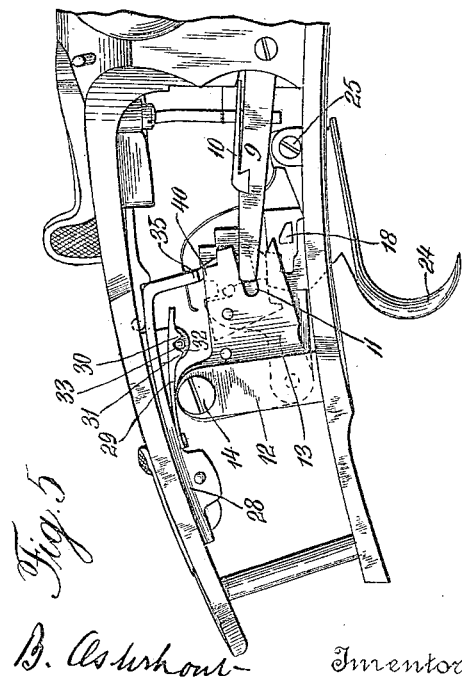

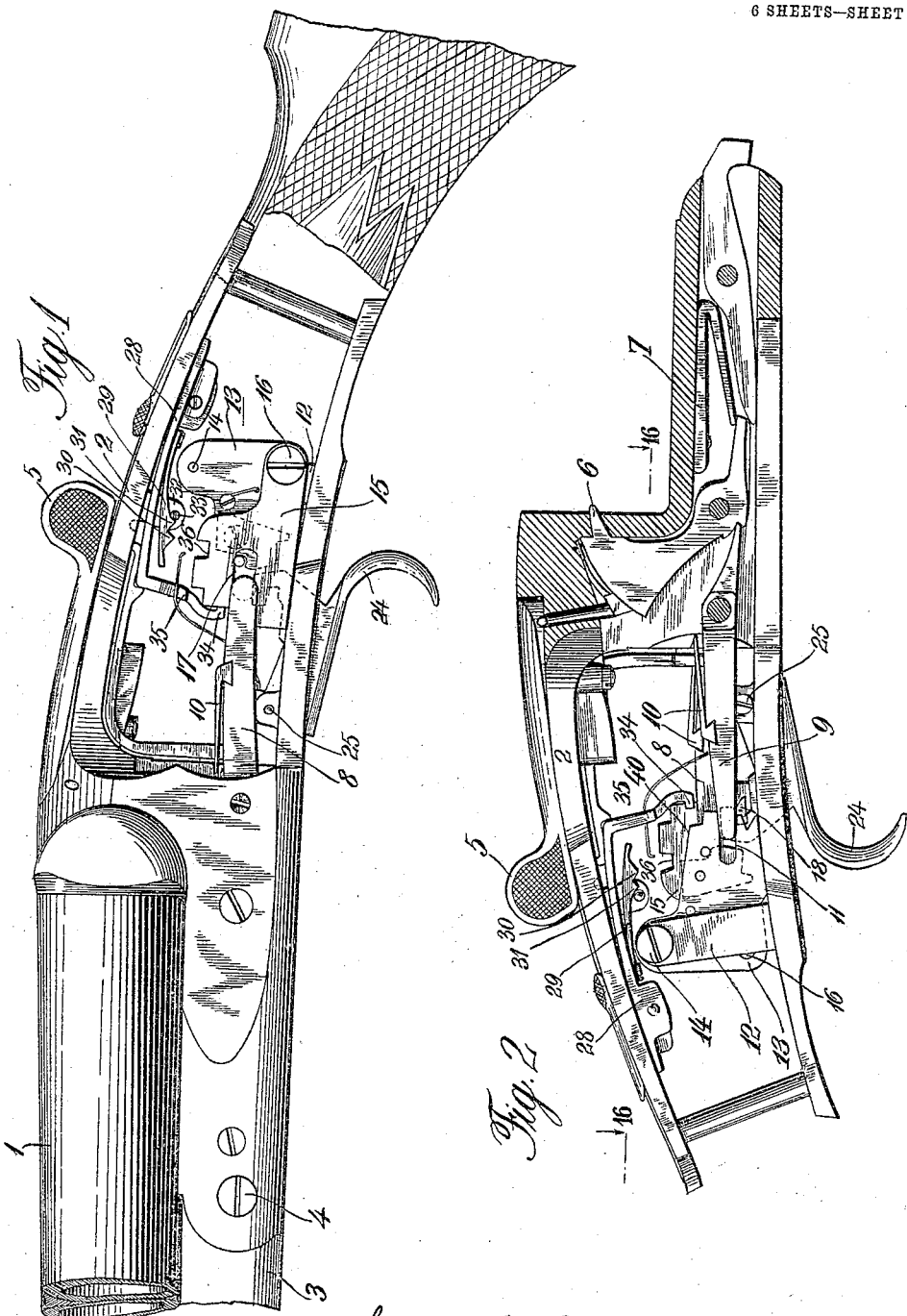

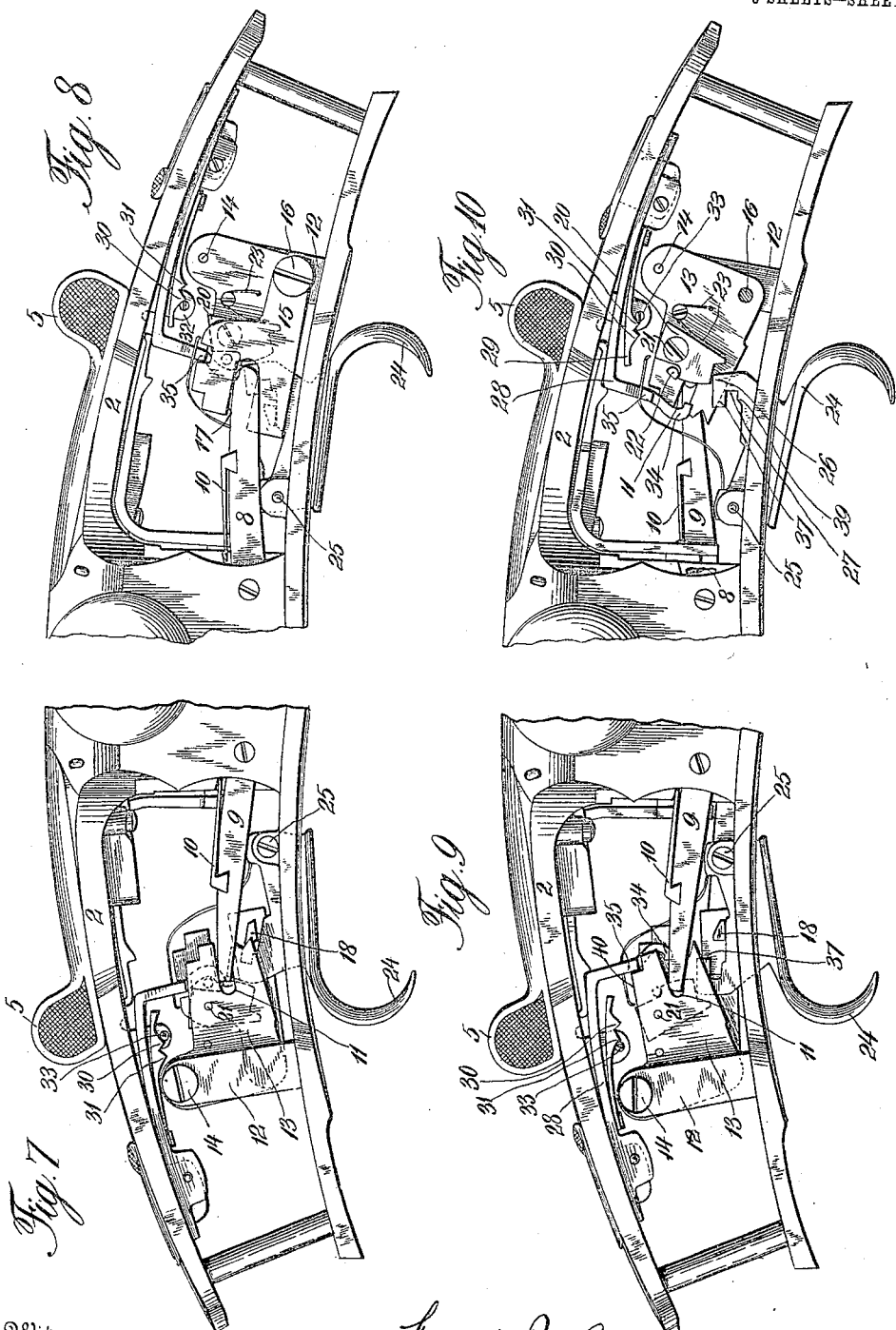

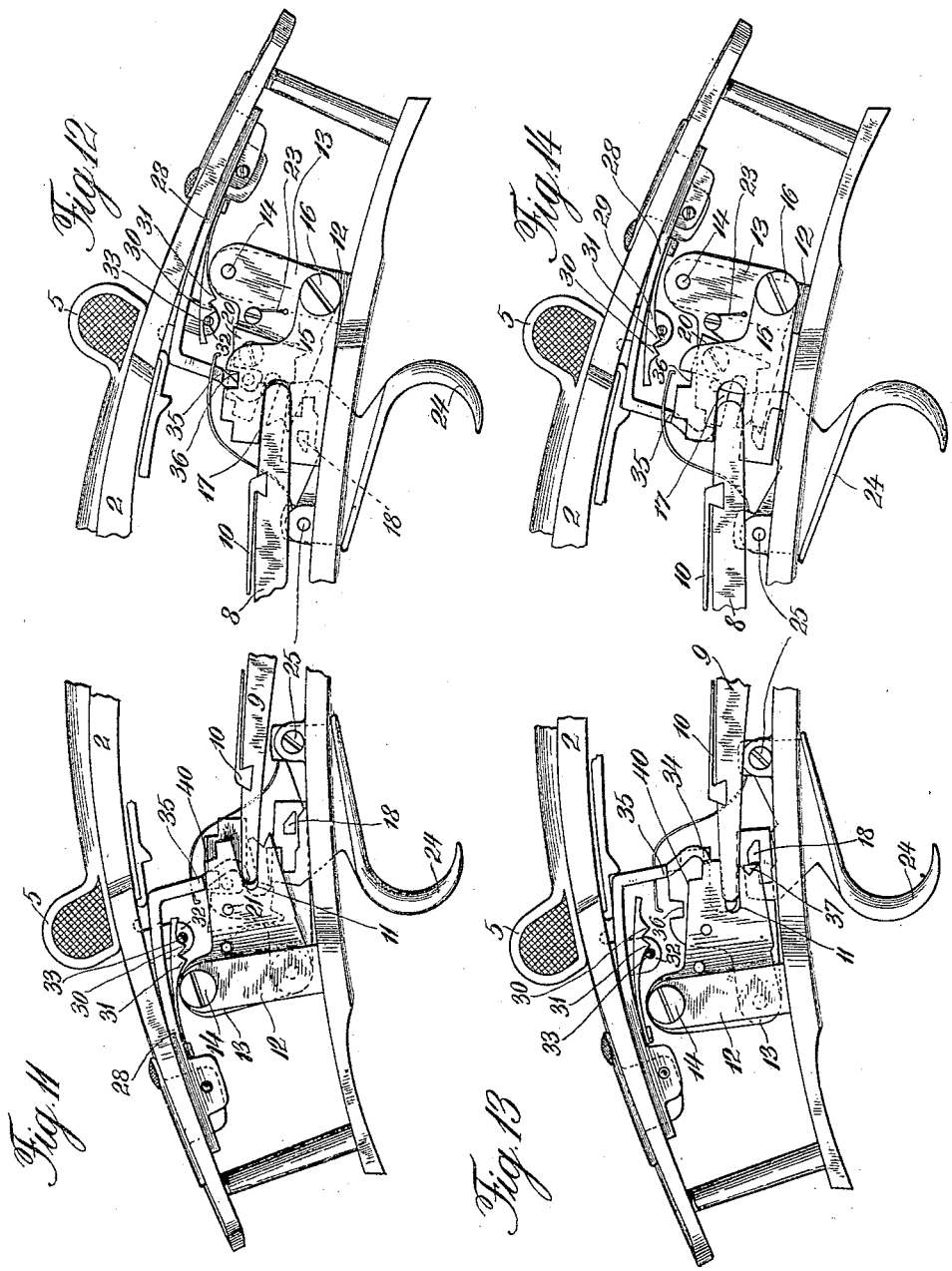

No. 821,118. PATENTED MAY 22, 1906.
G. B. OSTERHOUT.
SINGLE TRIGGER MECHANISM FOR GUNS.
APPLICATION FILED NOV. 28, 1905.
6 SHEETS—SHEET 5.
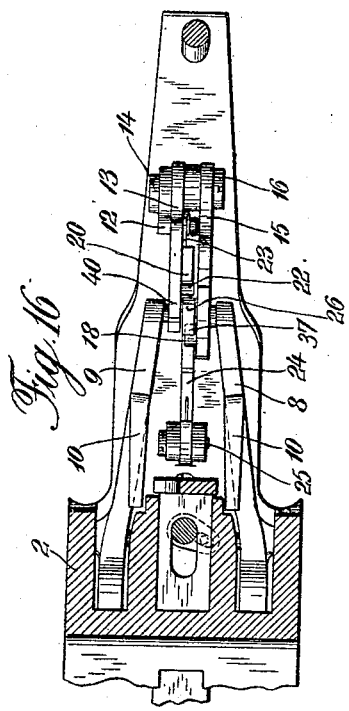
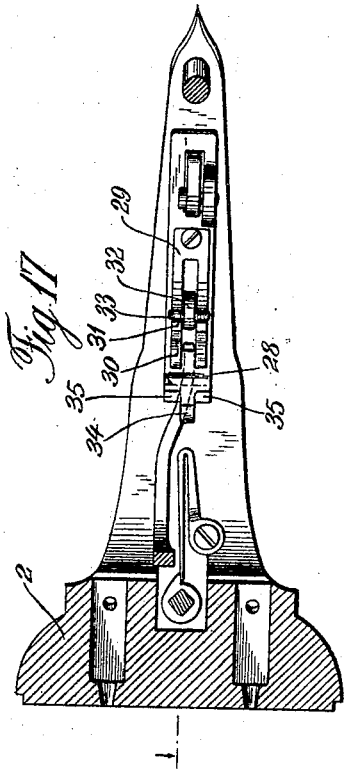
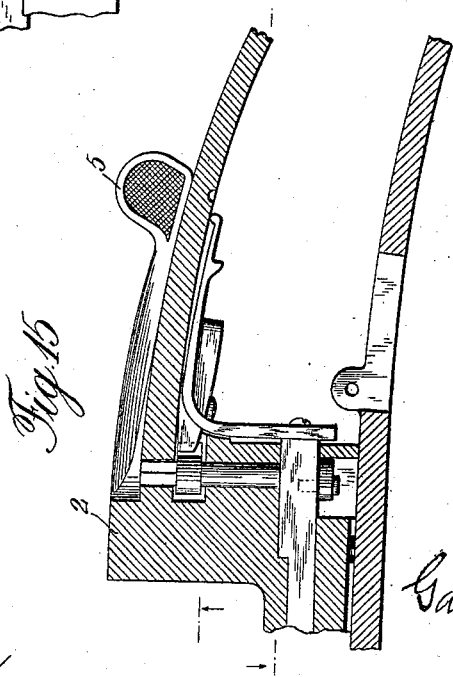

No. 821,118. PATENTED MAY 22, 1906.
G. B. OSTERHOUT.
SINGLE TRIGGER MECHANISM FOR GUNS.
APPLICATION FILED NOV. 28, 1905.
6 SHEETS—SHEET 6.
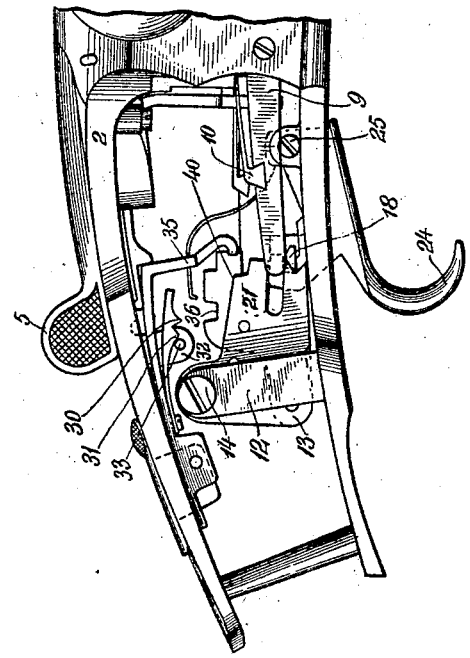
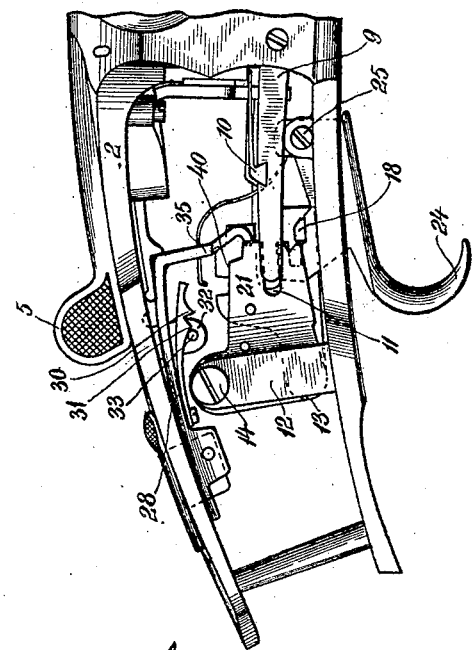
WITNESSES: INVENTOR
BY his ATTORNEY

UNITED STATES PATENT OFFICE.

GARRET B. OSTERHOUT, OF NEW YORK, N. Y.

SINGLE-TRIGGER MECHANISM FOR GUNS.

No. 821,118.　　　Specification of Letters Patent.　　　Patented May 22, 1906.

Application filed November 28, 1905. Serial No. 289,395.

*To all whom it may concern:*

Be it known that I, GARRET B. OSTERHOUT, a citizen of the United States, and a resident of 917 Greene avenue, Brooklyn, New York city, in the county of Kings and State of New York, have invented certain new and useful Improvements in Single-Trigger Mechanism for Guns, of which the following is a specification.

My invention relates to single-trigger mechanism for guns in which a single trigger is designed to successively trip the firing mechanisms of the respective barrels of the gun; and the objects of my invention are to produce a simple and effective mechanism for accomplishing this result, together with means for preventing the premature or accidental discharge of the respective firing mechanisms. I attain these objects by the mechanism illustrated in the accompanying drawings, in which—

Figure 1 is an elevation of a gun, viewed from the left side thereof, equipped with my improved mechanism, portions of the stock and barrels being broken away and the side plates being removed. Fig. 2 is an elevation of the frame and action of a gun, partly in section, viewing the same from the right side with the stock and barrels removed and both hammers down. Fig. 3 is an elevation viewed from the right side of the frame and action of a gun, partly broken away, showing my improved mechanism with both barrels cocked and the safety device in a forward position, so that the right-hand sear can be tripped by a pull on the trigger. Fig. 4 is a side elevation, viewed from the left side, of the frame and action of a gun, partly broken away, equipped with my single-trigger mechanism, showing the mechanism in the same position as in Fig. 3. Fig. 5 shows an elevation, viewed from the right side, of the frame and action of a gun, partly broken away, equipped with my improvement, both barrels cocked and the safety device in the middle position, so that neither firing mechanism can be tripped by a pull on the trigger. Fig. 6 is a side elevation, viewed from the left side, of the frame and action of a gun, partly broken away and equipped with my mechanism, the parts being in the same position as shown in Fig. 5. Fig. 7 is a side elevation, partly broken away, viewed from the right side, of the frame and action of a gun equipped with my mechanism, the safety device being in the rear position and the right firing mechanism being cocked and the left firing mechanism being tripped and the trigger still lifted. Fig. 8 is an elevation, partly broken away, viewed from the left side, showing the same parts in the same position as in Fig. 7. Fig. 9 is a side elevation of the frame and action of a gun, partly broken away and equipped with my mechanism, the left sear having been tripped and the safety moved forward, so that the trigger is in position to trip the right sear. Fig. 10 is a side elevation, partly broken away, of the frame and action of a gun equipped with my mechanism, the tripping member which acts upon the left-hand firing mechanism being removed. Fig. 11 is an elevation, viewed from the right side, of the frame and action of a gun, partly broken away, showing both firing mechanisms at full-cock and the parts in position to shoot the left barrel only. Fig. 12 is an elevation viewed from the left side, showing the parts in the same position as in Fig. 11. Fig. 13 is an elevation, viewed from the right side, of the frame and action of a gun, partly broken away, showing the right mechanism after it has been tripped and the left mechanism at full-cock with the safety in the forward position and the mechanism shifted to the intermediate position, where it is locked until after the involuntary pull on the trigger. Fig. 14 is an elevation viewed from the left side, partly broken away, showing the parts in the same position as in Fig. 12. Fig. 15 is an elevation, partly in section, of the frame of a gun. Fig. 16 is a plan view, partly in section, of a firing mechanism provided with my improvement, viewed from the under side. Fig. 17 is also a plan view, partly in section, of a gun-frame and action provided with my improvement, viewed from the under side. Fig. 18 is an elevation viewed from the right side, showing the action and frame of a gun equipped with my mechanism, partly broken away, the left firing mechanism being at full-cock, the right firing mechanism having been tripped, and the parts in the position which they occupy when the trigger has been elevated by the pull thereon produced by the recoil resulting from the discharge of the right barrel, the safety device being in the forward position. Fig. 19 is an elevation viewed from the right side, showing the frame and action of a gun equipped with my mechanism, partly broken away, the left firing mechanism being at full-cock, the right firing mechanism having been tripped, and the parts in the position which they occupy after the release of the involuntary pull upon the trigger produced by the recoil resulting from the discharge of the right barrel and in such position that a pull upon the trigger will discharge the left barrel, the safety device being in the forward position.

In the drawings, 1 indicates the barrels, 2 the frame, 3 the fore-end, 4 the pivot by which the barrels and fore-end are pivoted to the frame, 5 the top lever by which the barrels are locked to the frame of the gun when closed, 6 the hammers, 7 the main spring, 8 the left sear, 9 the right sear, and 10 the springs to operate the sears, all of which parts are practically the usual and well-known construction of the firearm commonly called "double-barreled hammerless shotgun." The general construction and operation of a double-barreled hammerless shotgun are well understood, and a detailed description is hardly necessary, but for the purpose of explanation may be briefly described as follows: The gun shown is of the breakdown type, and upon the release of the barrel-locking mechanism by the manipulation of the lever 5 the barrels swing on the pivot 4, which in addition to actuating the ejecting mechanism also operates the cocking mechanism and brings the hammers to full-cock.

12 is a post rigidly attached to the frame, to which is pivoted, by means of the screw 14, an angle-plate 13, which forms one of the tripping members and is provided with a slot 11, which engages with the right sear 9.

15 is a tripping member pivoted, by means of the screw 16, to the angle-plate 13. This tripping member is provided with a slot 17, which registers with the left sear 8. It is also provided with a shoulder 18, projecting from its inner face. On the inner face of the angle-plate or tripping member 13 is pivoted a plate 20 by means of a screw 21. The inner face of the tripping member 13 is also provided with a shoulder 22, which limits the forward motion of the plate 20. The plate 20 is held in a forward position by means of a spring 23.

24 is the trigger, which is pivoted to the frame in the usual manner by a pin 25 and is provided with a shoulder 26, which is adapted to contact with the plate 20 when the right firing mechanism is at full-cock and the safety device is in the middle or forward position. The trigger is also provided with a recess 27, into which the shoulder 18 is adapted to pass when the right barrel has been fired and after the involuntary pull upon the trigger resulting from the recoil produced by the discharge of the right barrel.

28 is a safety device which is provided with a spring 29, having the shoulders 30 31.

32 is a post mounted on the frame of the gun and provided with a pin 33. The spring 29 is slotted, so as to receive the post 32 and permit the spring 29 to ride on the pin 33 on either side of the post 32, and the shoulders 30 and 31 are adapted to lock and retain the safety mechanism in three different positions—first, the forward position, in which the safety is out of contact with the right tripping member and in contact with the left tripping member when both barrels are at full-cock; second, the middle position, in which the safety is in contact with both tripping members, so that neither barrel can be fired; third, the rear position, in which the safety is in contact with the right tripping member, but out of contact with the left tripping member. When the safety is in the rear position, the downwardly-projecting point 34 of the safety will push back the plate 20, so that it will not be in position to contact with the shoulder 26 on the trigger, and when the safety is in this extreme rear position the shoulder 35 registers with the slot 36 on the left tripping member, rendering it possible to elevate this tripping member without contacting with the safety, and thereby permitting the discharge of the left barrel. As the right tripping member is pivoted at its upper end to the post 12 and as the right hammer is cut away, so that when the hammer is down the forward end of its sear will be somewhat elevated as compared with its position when the hammer is at full-cock, the rear end of the sear will be correspondingly depressed, and this depression of the sear causes a downward and backward movement of the tripping member 13. As the left tripping member 15 is pivoted to 13, it is also carried backward by the movement of 13 until the shoulder 18 comes into contact with the shoulder 37 on the trigger, the trigger being forced downward by the plate 20, which rides on the shoulder 26 on the trigger. The pull on the trigger having been released by the recoil of the gun, the trigger is forced downward until the recess 27 is below the shoulder 18 before the shoulder 18 comes in contact with the trigger. The downward movement of the trigger continues until the plate 20 is shifted back and out of contact with the shoulder 26. When the parts are in this position, a pull upon the trigger will not elevate either firing mechanism. On the rebound of the gun resulting from the recoil produced by the discharge an involuntary pull on the trigger occurs, which causes an elevation of the trigger and permits the shoulder 18 to be forced backward until it contacts with the shoulder 39, by which its movement is arrested. While the parts are in this position, the upper edge of the left tripping member 15 rests against the shoulder 35 of the safety, preventing any upward movement of the tripping member 15. As soon as the involuntary pull is released the trigger drops slightly, and the parts shift backward until the shoulder 18 passes into the recess 27, and when the parts are in this position the tripping member 15 has passed backward until its upper edge is out of contact with the shoulder 35, and when the trigger is then pulled the left sear 8 is tripped by the upward movement of the trigger and the left tripping member 15. When the operator desires to fire the left barrel first, the safety is moved to the extreme rearward position, in which position the projection 34 on the safety pushes backward the plate 20, carrying it out of contact with the shoulder 26. In this position the shoulder 35 on the safety registers with the recess 36 on the left tripping member, permitting the trigger to be lifted, so as to contact with the shoulder 18 and force the left tripping member upward and trip the left sear. When the safety is in the middle position, the shoulder 35 rides on the upper face of the left tripping member 15 and the shoulder 40 on the upper face of the right tripping member 13, preventing any upward movement of both of the tripping members and of their respective sears, rendering any upward movement of the trigger or of the respective tripping members or the sears with which they coöperate impossible, and thus prevents the accidental discharge of either firing mechanism.

Having thus described my invention, what I claim as new, and desire to secure by Letters Patent, is—

1. In a single-trigger mechanism the combination with a plurality of firing mechanisms in which are included hammers and sears, of a single trigger, tripping members engaging respectively with the said sears, the first of said tripping members being pivoted to the frame of the gun and another tripping member pivoted to the first tripping member and means whereby the first tripping member is forced downward and backward when the sear with which it is engaged is tripped and the second tripping member is forced backward and into engagement with the trigger mechanism, substantially as and for the purposes described.

2. In a single-trigger mechanism the combination with a plurality of firing mechanisms which include hammers and sears, of a single trigger, two tripping members engaging respectively the said sears, the first of said tripping members being pivoted to the frame of the gun and the second tripping member to the first tripping member and means whereby the first tripping member is forced downward and backward when the sear with which it is engaged is tripped and the second tripping member is forced backward and into engagement with a stop which prevents its further backward movement, means for releasing said tripping member from said stop by a pull upon the trigger and permitting the second tripping member to shift backward into engagement with the trigger mechanism substantially as and for the purposes described.

3. In a single-trigger mechanism the combination with a plurality of firing mechanisms which include hammers and sears, of a single trigger, tripping members engaging respectively with the said sears, the first of said tripping members being pivoted to the frame of the gun and the second tripping member to the first tripping member, means whereby the first tripping member is forced downward and backward when the sear with which it is engaged is tripped and the second tripping member is forced backward and into engagement with a stop which prevents its further movement, means for releasing the said tripping member from said stop by a pull upon the trigger, a second stop which limits the shifting of the tripping members until the second pull upon the trigger is released and means for shifting the second tripping member into engagement with the trigger mechanism, substantially as and for the purposes described.

4. In a single-trigger mechanism the combination with a plurality of firing mechanisms which include hammers and sears, of a single trigger, tripping members engaging respectively with said sears, means for shifting the first tripping member backward when the sear with which it is in engagement has been tripped, means for connecting the second tripping member to the first tripping member so that the backward movement of the first tripping member will be communicated to the second tripping member, stops on the trigger which limit the backward movement of the second tripping member, the first stop being so located that a second pull on the trigger will cause it to pass out of engagement with the tripping members and a second stop on said trigger which prevents the complete backward movement of the tripping member when the trigger is in an elevated position, substantially as and for the purposes specified.

5. In a single-trigger mechanism the combination with a plurality of firing mechanisms in which are included hammers and sears, of a single trigger, tripping members engaging respectively with the said sears and with each other and a safety device which is adapted to ride upon the upper face of said tripping members, said safety device being adapted to be moved forward and out of engagement with the first tripping member and to remain in contact with the second tripping member and means for shifting the second tripping member backward and out of engagement with said safety device when the first tripping member has tripped the sear with which it is in engagement, substantially as and for the purposes described.

6. In a single-trigger mechanism the combination with a plurality of firing mechanisms in which are included hammers and sears, of tripping members engaging respectively with said sears and a safety device consisting of a stop adapted to be interposed between the upper face of said tripping members and the frame of the gun and manual means for shifting the said safety device out of an engagement with the first tripping member and automatic means for shifting the second tripping member out of engagement with said safety device when the sear with which the first tripping member is in engagement has been tripped, substantially as and for the purposes described.

7. In a single-trigger mechanism comprising a plurality of hammers and sears, of two tripping members engaging respectively with said sears, the first tripping member being provided with a shoulder pivoted thereto, normally adapted to engage with a shoulder on the single trigger, a safety device adapted to be interposed between the tripping members and the frame of the gun and capable of longitudinal movement and provided with a finger adapted to contact with the said movable shoulder and force such shoulder out of contact with the trigger, substantially as and for the purposes described.

Signed at New York city, in the county of New York and State of New York, this 18th day of November, A. D. 1905.

GARRET B. OSTERHOUT.

Witnesses:
C. C. NERGHMOND,
B. A. ITTNER.